Jan. 14, 1941.    R. H. TOWNSEND ET AL    2,228,541
MEANS FOR PRODUCING NOISELESS FILM SPLICES
Filed Feb. 1, 1938    2 Sheets-Sheet 1
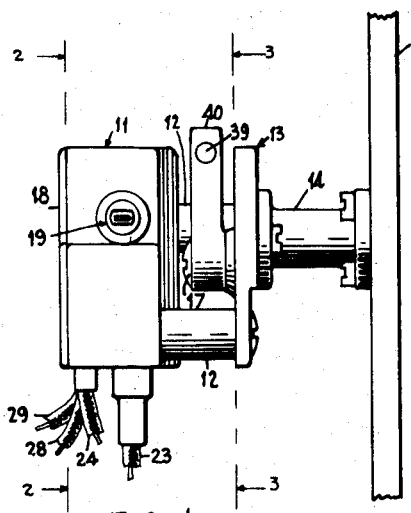
Fig. 1.
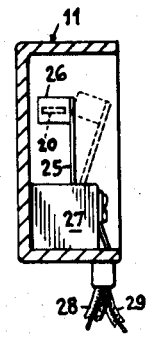
Fig. 4.
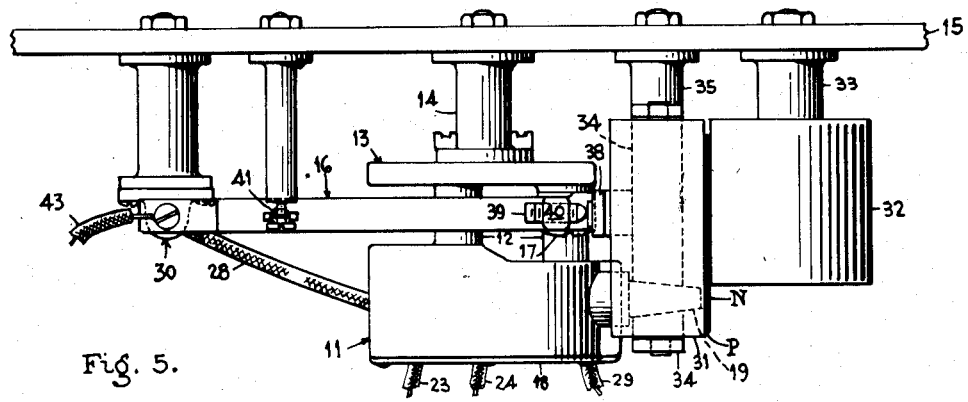
Fig. 5.
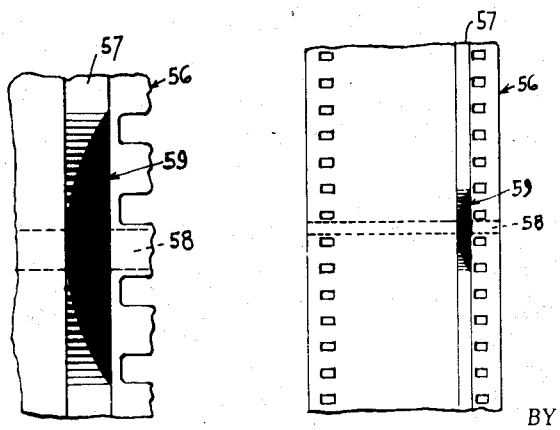
Fig. 7.    Fig. 6.
INVENTORS.
Ralph H. Townsend,
Robert C. Stevens.
BY
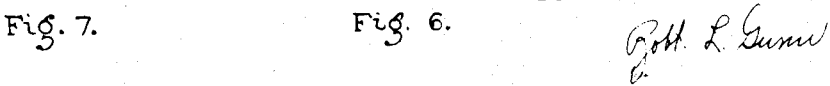
ATTORNEY.

INVENTORS.
Ralph H. Townsend.
Robert C. Stevens.
BY
Rtt. L. Gunn
ATTORNEY.

Patented Jan. 14, 1941

2,228,541

UNITED STATES PATENT OFFICE 2,228,541

MEANS FOR PRODUCING NOISELESS FILM SPLICES

Ralph Hunt Townsend and Robert Colby Stevens, Los Angeles, Calif., assignors to Twentieth Century-Fox Film Corporation, Los Angeles, Calif., a corporation of New York Application February 1, 1938, Serial No. 188,100

4 Claims. (Cl. 95—75)

This invention relates to the art of making sound tracks and deals with a means for photographically treating splices in sound tracks during the printing operation to render them noiseless in the reproduction of sound.

The invention to be hereinafter described and claimed refers to a copending application, Serial Number 188,104, entitled Means for producing noiseless film splices, filed February 1, 1938, by Earle Jordan Lytle, and is drawn to cover another means for producing noiseless film splices, now Patent No. 2,207,298.

In producing sound tracks, it is known that an original sound track comprises a plurality of sections spliced together. In practice, the splices are made by overlapping short ends of film and cementing them together. When the sound track is printed, these overlapping sections will produce an image on the positive sound track, which will create an objectionable noise termed a "bloop" when the positive is used for the reproduction of sound. Many and various attempts have been made to overcome this blooping caused by splices.

It is an object of our invention to show a method whereby a secondary photographic density may be automatically produced over the image of the splice in the positive during the printing operation thereon. In order to render this secondary photographic density noiseless when passing a scanning slit, it is necessary that the photo electric cell see a cyclical change in density substantially corresponding to a sinusoidal curve. This means that the density on the film must build up from zero to a maximum over the image of the splice and decrease away from the splice in a reverse order. It also means that the over all length of the density must be sufficient so that the time required to pass the scanning slit will produce an electrical response below the audible frequency range. A sinusoidal response of this length will produce inaudible noise which will be unobjectionable.

Another object of this invention is to produce the printer to close a circuit which energizes the electric means employed.

Other objects and advantages will appear in conjunction with the drawings in which:

Figure 1 is a view taken on line 1—1 of Figure 2.

Figure 4 is a cross sectional view taken on line 4—4 of Figure 2.

Figure 5 is a fragmentary top plan view taken on line 5—5 of Figure 2.

Figure 6 is a section of film showing the type of splice covering produced by my invention, and Figure 7 is an enlarged view showing in detail the nature of the photographic density covering the image of the splice.

Briefly stated, the invention comprises a constant source of light arranged to transmit light through a slit onto the sound track of the positive film. Over the slit we provide an electrically operated shutter which is adapted to open and close the slit in a manner to form a density of the character to be described over the image of splices in the sound track. The invention embodies a method for this purpose, an electrically operated means for practicing the method and a film having a secondary photographic density to be more fully described hereinafter.

Figure 2:
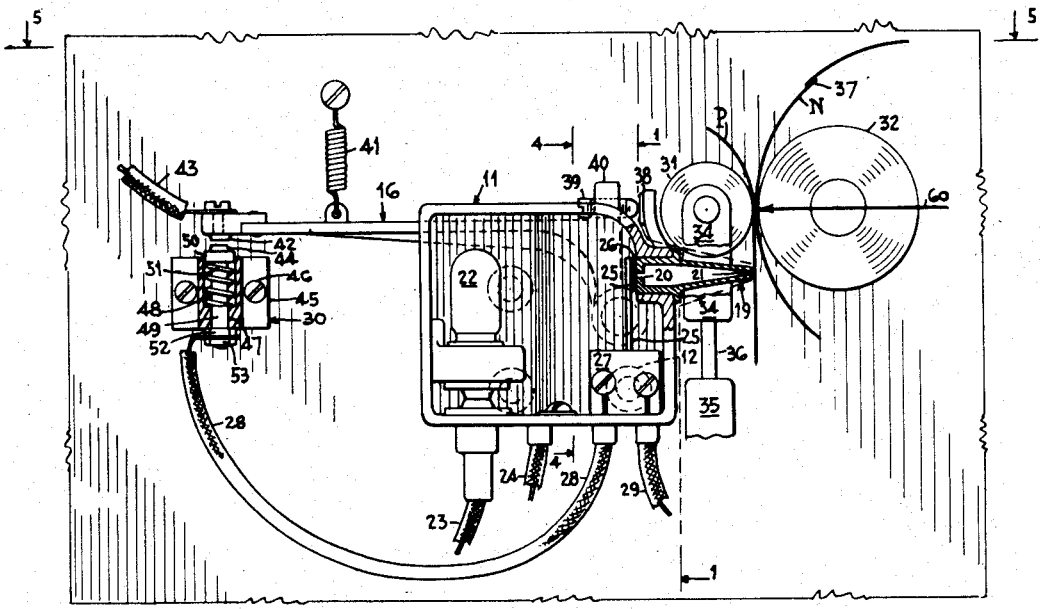
Figure 2 is a side elevation partly in section taken on line 2—2 of Figure 1.
Figure 3:
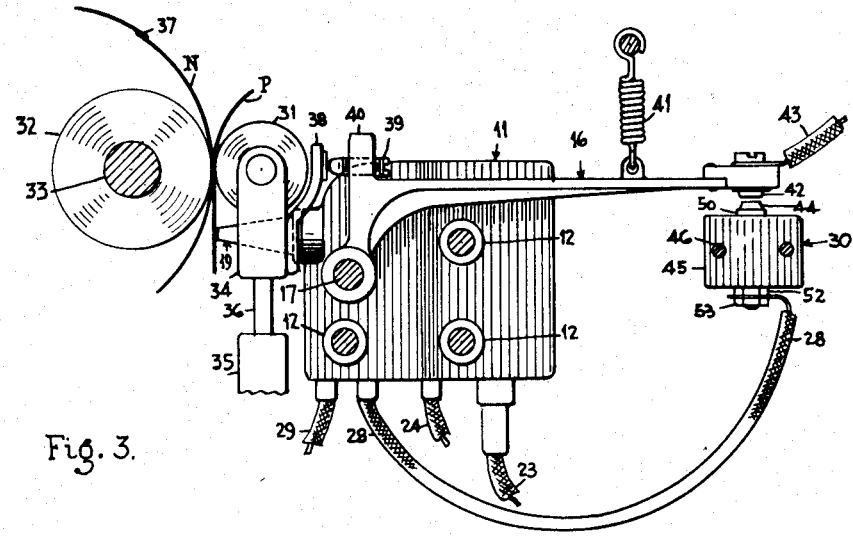
Figure 3 is a rear side elevation taken on line 3—3 of Figure 1.

Referring to the drawings, the means for this purpose will be described. In Figure 1 we have shown a front elevation of our device taken on line 1—1 of Figure 2. Here it will be seen that our device comprises a casing generally designated 11, said casing in turn being supported by legs 12 upon a plate 13 which is supported upon a pedestal 14 mounted upon a section of a printer frame 15. Also mounted on plate 13 we have shown an arm generally designated 16 that is arranged to swing upon a pivot 17. The casing 11 is equipped with a cover plate 18. In Figure 2 we have shown a view of the device taken on Jan. 14, 1941.　　　A. L. WALLOF　　　2,228,544
ELECTRIC MACHINE
Filed March 20, 1939　　　3 Sheets-Sheet 1
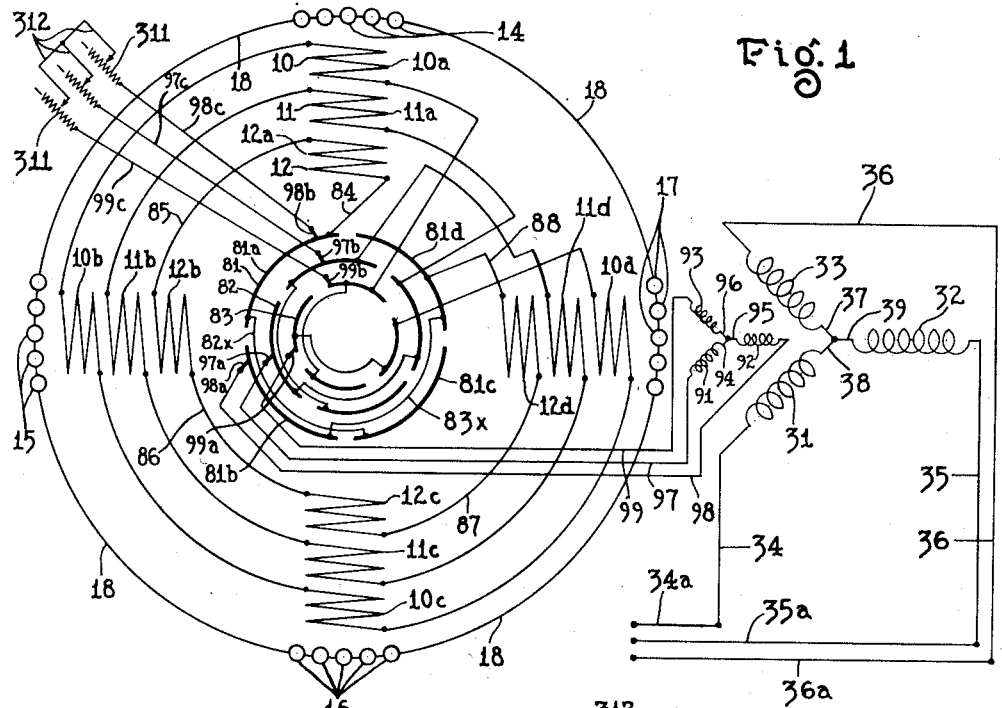
Fig. 1
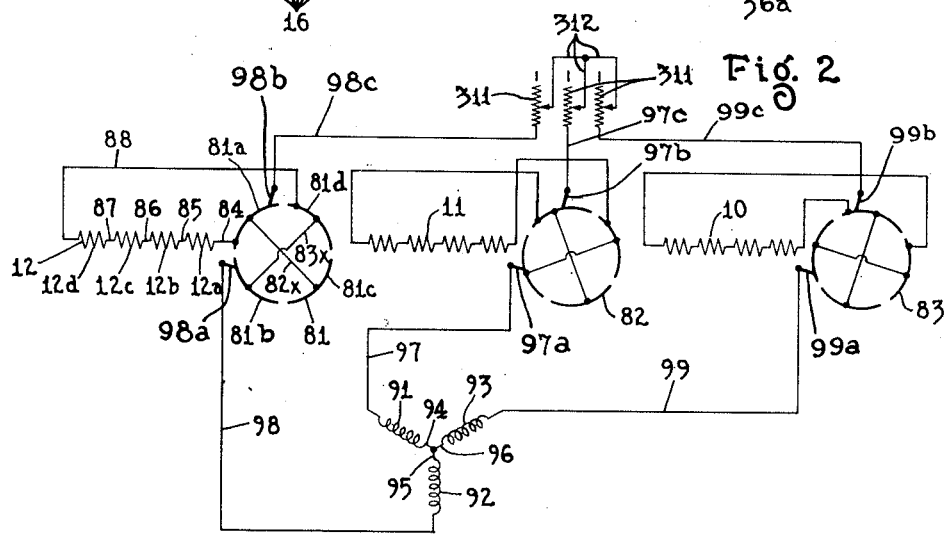
Fig. 2
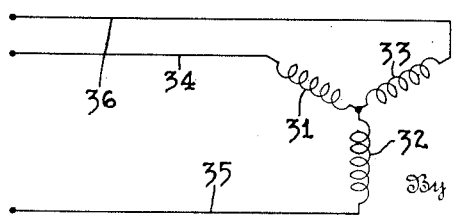
Inventor
Arthur L. Wallof
By Caswell & Lagaard
Attorneys